United States Patent
Liaghati et al.

(10) Patent No.: US 10,317,292 B2
(45) Date of Patent: Jun. 11, 2019

(54) TWO-WIRE RESISTANCE TEMPERATURE DETECTOR AND METHOD OF USE

(71) Applicant: The Boeing Company, Chicago, IL (US)

(72) Inventors: Amir Liaghati, Huntsville, AL (US); Jordan Miller, Huntsville, AL (US); David Rushing, Madison, AL (US); John Blumer, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 15/441,948

(22) Filed: Feb. 24, 2017

(65) Prior Publication Data

US 2018/0245991 A1    Aug. 30, 2018

(51) Int. Cl.
    *G01K 7/20*    (2006.01)
(52) U.S. Cl.
    CPC ...................... *G01K 7/20* (2013.01)
(58) Field of Classification Search
    CPC .................................................. G01K 7/20
    See application file for complete search history.

(56) References Cited

U.S. PATENT DOCUMENTS

| | | | | |
|---|---|---|---|---|
| 2,508,478 A | * | 5/1950 | Frederick | G01K 7/24 324/705 |
| 3,513,460 A | * | 5/1970 | Field | G01K 1/024 340/870.13 |
| 4,142,148 A | * | 2/1979 | Johansson | E21B 47/12 324/140 R |
| 4,830,488 A | * | 5/1989 | Heinze | A61N 1/36557 600/325 |
| 6,938,474 B2 | * | 9/2005 | Melås | A61B 5/02158 374/E1.008 |
| 7,004,625 B2 | | 2/2006 | Egidio | |
| 7,508,225 B2 | * | 3/2009 | Taylor | G01K 1/026 324/713 |

(Continued)

OTHER PUBLICATIONS

T. K. Maiti ("A Novel Lead-Wire-Resistance Compensation Technique Using Two-Wire Resistance Temperature Detector." IEEE Sensors Journal 6, No. 6 (2006): 1454-458. doi:10.1109/jsen.2006.883903.).*

(Continued)

*Primary Examiner* — Clayton E. LaBalle
*Assistant Examiner* — Leon W Rhodes, Jr.

(57) ABSTRACT

A two-wire resistance temperature detector (RTD) includes an RTD sensor having a sensor resistance that changes in correspondence with changes in the temperature of the RTD sensor. The two-wire RTD additionally includes a pair of leads electrically coupling the RTD sensor to a control unit having a pulse generator for generating a first current pulse and a second current pulse. The two-wire RTD also includes a switch electrically coupled between the pair of leads and operable in an open state when subjected to the first current pulse and operable in a closed state when subjected to the second current pulse. The open state causes the first current pulse to flow through the pair of leads and the RTD sensor. The closed state causes the second current pulse to flow through the pair of leads. The switch enables the control unit to determine the sensor resistance and corresponding sensor temperature.

20 Claims, 11 Drawing Sheets

(56) References Cited

U.S. PATENT DOCUMENTS 8,538,731 B2 * 9/2013 Parachini ............... G01D 21/00
702/188
9,772,231 B2 * 9/2017 Lim ......................... G01K 7/01

OTHER PUBLICATIONS omega.com, "RTD Temperature vs. Resistance Table," retrieved Feb. 24, 2017.

* cited by examiner

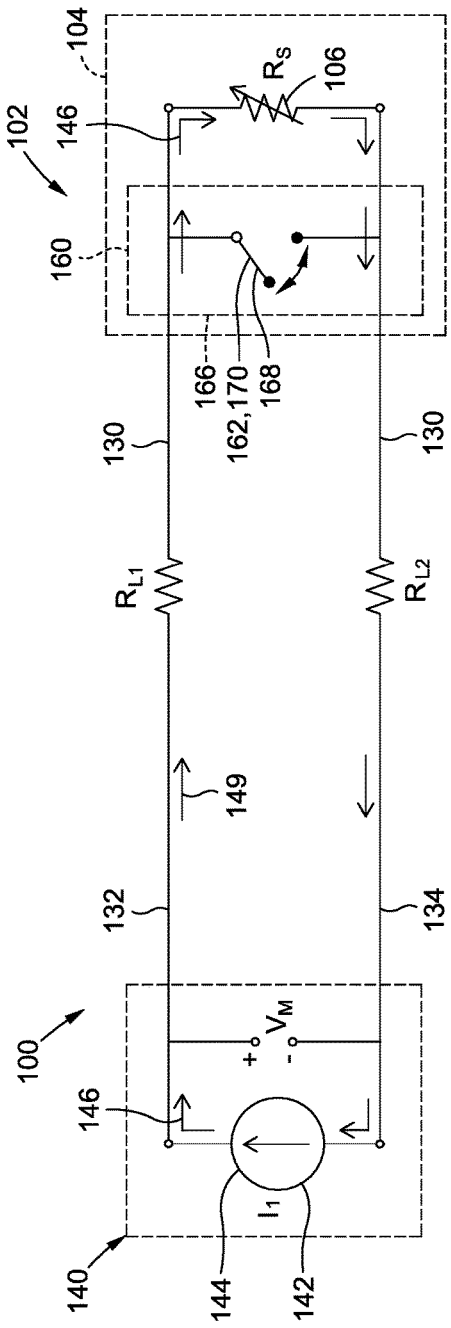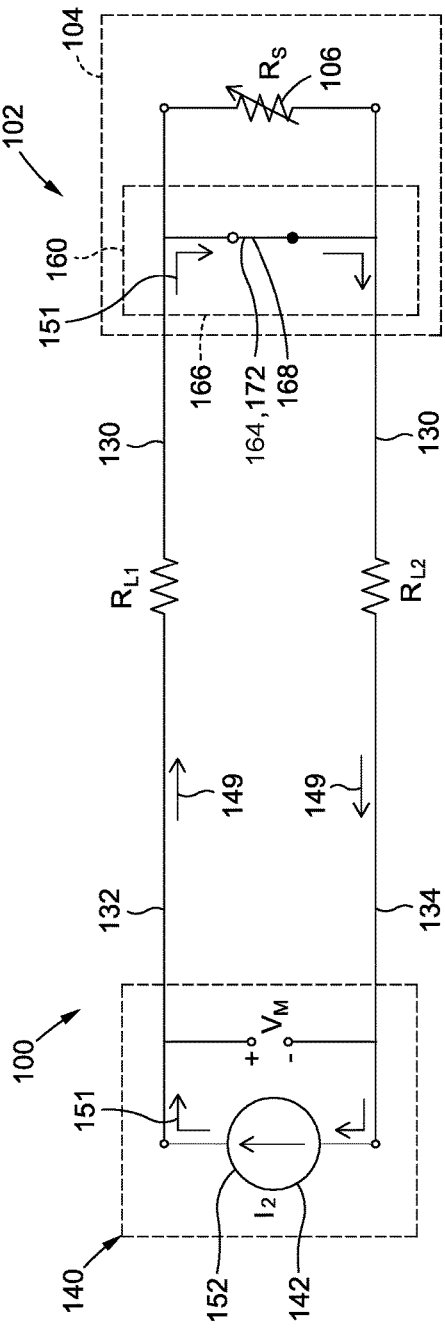
FIG. 7
FIG. 8

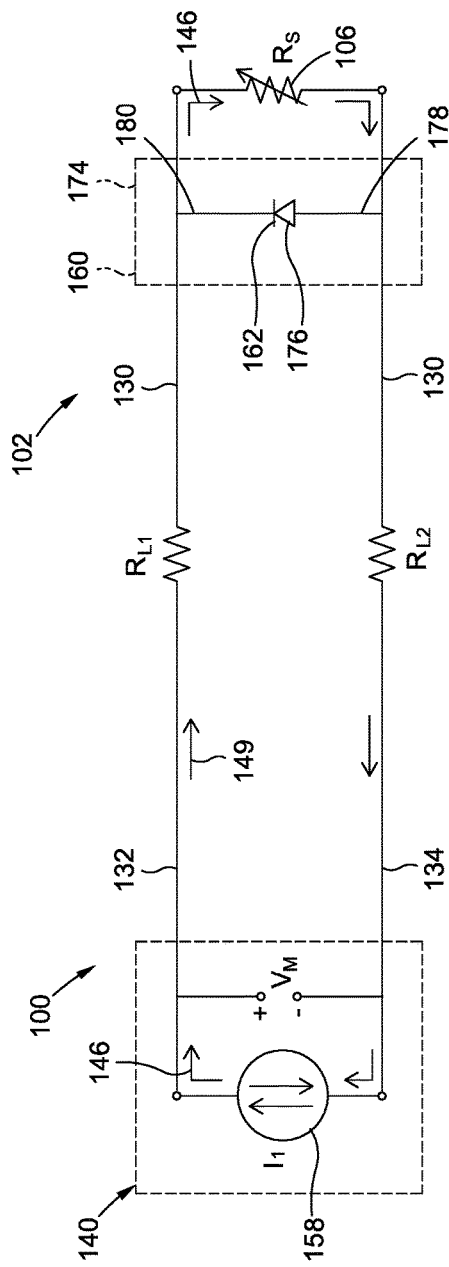
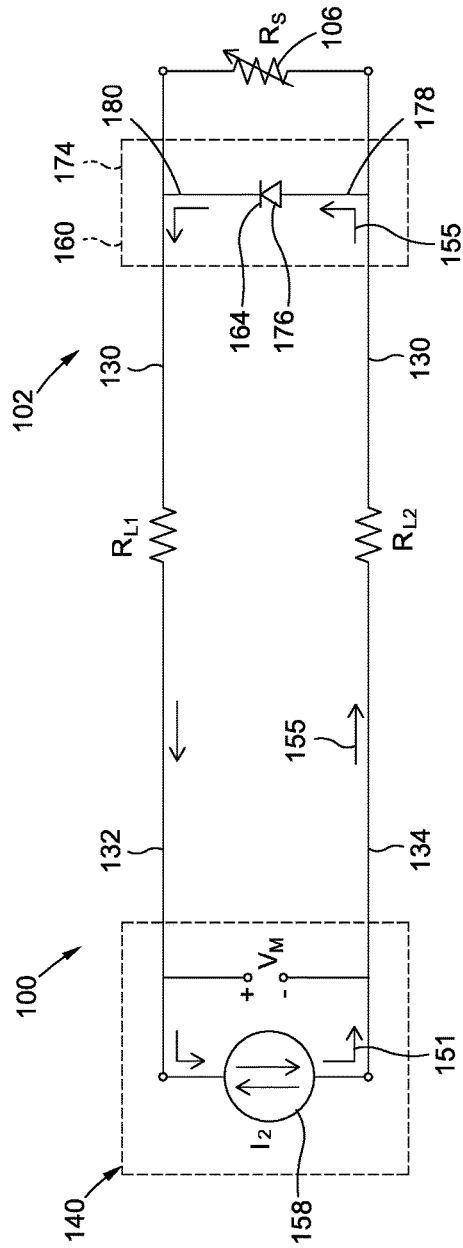
FIG. 10
FIG. 11

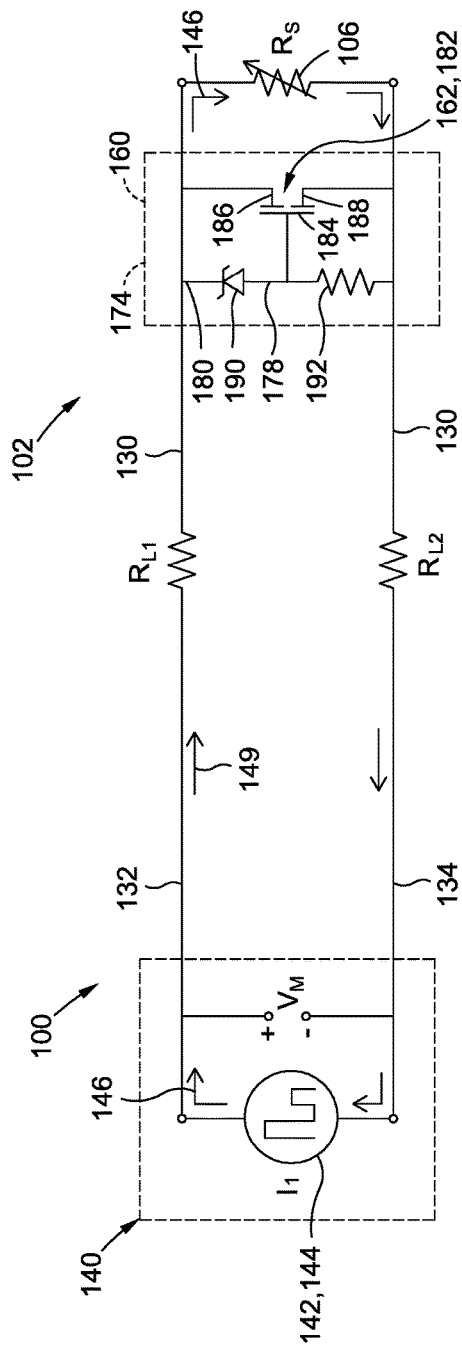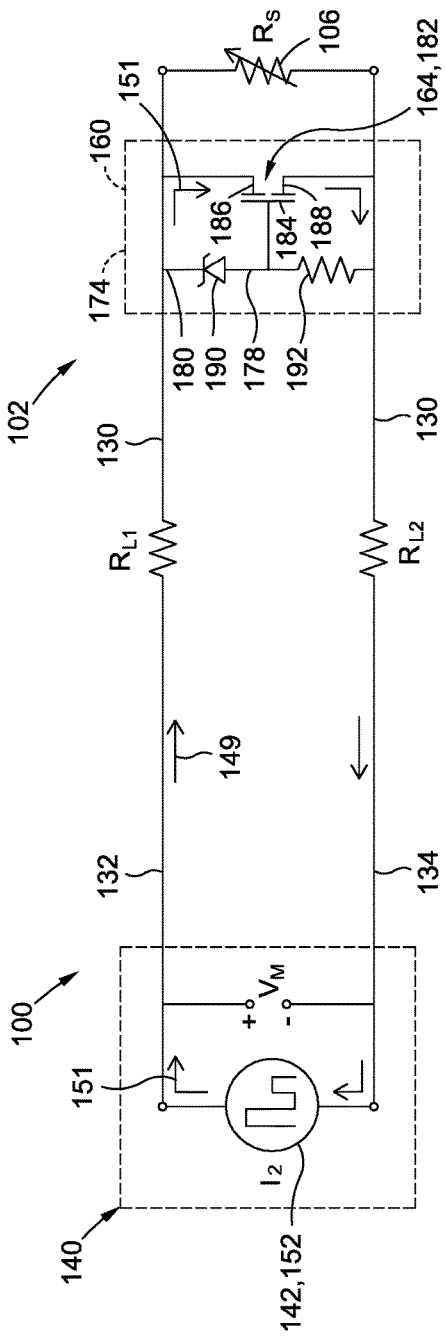
FIG. 12
FIG. 13

TWO-WIRE RESISTANCE TEMPERATURE DETECTOR AND METHOD OF USE

STATEMENT RE: FEDERALLY SPONSORED RESEARCH/DEVELOPMENT

This invention was made with Government support under contract number NNM07AB03C awarded by NASA. The government has certain rights in this invention.

FIELD

The present disclosure relates generally to temperature measurement and, more particularly, to a two-wire resistance temperature detector having improved accuracy.

BACKGROUND

Certain systems require highly accurate temperature measurements for proper operation. For example, a space launch vehicle may include hundreds of temperature sensors for accurate monitoring of a variety of subsystems for proper functioning. In a specific example, a launch vehicle with a liquid propellant rocket engine may require accurate monitoring of the temperature of cryogenic propellant. The launch vehicle may have a control unit for thermal management of the cryogenic propellant. The control unit may require temperature measurements of the cryogenic propellant at different locations on the launch vehicle such as on propellant tanks, fluid conduits, valves, and other propellant system components. In some examples, the control unit may be located a relatively long distance from where temperature measurements are taken.

A resistance temperature detector (RTD) is a device containing an RTD sensor (e.g., a resistance element) which may be mounted to a component for which temperature measurements are desired. Passing a small amount of electrical current (i.e., an excitation current) through the RTD sensor generates a voltage across the RTD sensor. The voltage across the RTD sensor is used to determine the resistance of the RTD sensor at the time when the current is passed through the RTD sensor. The sensor resistance is used to determine the temperature of the RTD sensor which varies linearly with sensor resistance. In this regard, the hotter the RTD sensor becomes, the higher the sensor resistance, and vice versa. The RTD sensor may be electrically coupled to a control unit which may measure the sensor voltage for determining the sensor resistance for subsequent correlation to sensor temperature.

In a conventional two-wire RTD, the RTD sensor may be electrically coupled to the control unit by a pair of wire leads such as insulated copper wires. Unfortunately, the resistance of the wire leads adds to the resistance of the RTD sensor, such that the total electrical resistance determined by the control unit is greater than the resistance of the RTD sensor alone, resulting in an erroneous temperature measurement. The error in temperature measurement is proportional to the length of the wire leads such that very long wire leads introduce correspondingly large temperature measurement errors. In addition, the resistance of the wire leads is different at different temperatures. For example, when conventional two-wire RTDs are used at cryogenic temperatures (e.g., less than −300 F) such as for monitoring a cryogenic propellant system of a launch vehicle, the temperature measurement errors may be relatively large due to relatively small changes in resistance of the wire leads at cryogenic temperatures.

Attempts to compensate for errors associated with conventional two-wire RTDs include adjusting the total amount of resistance at the control unit by an amount equal to the static resistance of the wire leads. The static resistance of the wire leads can be calculated based on known resistance-per-foot values of each wire lead at a given temperature. Alternatively, the static resistance of wire leads at a given temperature can be measured. Unfortunately, during a flight or mission, the actual resistance of the wire leads may be different than the calculated or measured resistance of the wire leads. Furthermore, some lengthwise sections of the wire leads may be colder or hotter than the temperatures for which the static resistance was calculated or measured.

Other attempts to compensate for errors associated with conventional two-wire RTDs include the development of three-wire RTDs and four-wire RTDs. A three-wire RTD adds a third wire lead to a standard two-wire RTD. The third wire lead is used to transmit to the control unit a feedback signal which the control unit uses to compensate for temperature measurement errors caused by the added resistance of the wire leads. However, for a space launch vehicle having hundreds of temperature sensors, the addition of a third wire lead to the RTDs adds to the cost and weight of the launch vehicle and detracts from vehicle performance. For example, the increased weight of three-wire RTDs may result in a reduction in payload capability and/or available propellant mass of the launch vehicle. A four-wire RTD adds two wire leads to a standard two-wire RTD and simplifies the measurement process by only requiring a single voltage measurement by the control unit. The two extra wires do not carry the excitation current and therefore do not contribute to the measurement error. However, the two additional lead wires of a four-wire RTDs further increase the cost and weight of the RTD which further detracts from vehicle performance.

As can be seen, there exists a need in the art for a lightweight, low-cost resistance temperature detector capable of providing highly accurate temperature measurements.

SUMMARY

The above-noted needs associated with resistance temperature detectors are specifically addressed and alleviated by the present disclosure which provides a two-wire resistance temperature detector (RTD) that includes an RTD sensor having a sensor resistance that changes in correspondence with changes in temperature of the RTD sensor. In addition, the two-wire RTD includes a pair of leads electrically coupling the RTD sensor to a control unit having at least one current pulse generator configured to generate a first current pulse and a second current pulse. The pair of leads collectively have a lead resistance. The two-wire RTD also includes a switch electrically coupled between the pair of leads and operable in an open state when subjected to the first current pulse, and operable in a closed state when subjected to the second current pulse. The open state causes the first current pulse to flow through the pair of leads and the RTD sensor. The closed state causes the second current pulse to flow through the pair of leads via the switch. The switch enables the control unit to determine the sensor resistance and the corresponding sensor temperature based on the difference between the sensor resistance combined with the lead resistance when the switch is in the open state, and the lead resistance when the switch is in the closed state.

Also disclosed is a temperature detection system including a control unit and a two-wire RTD. The control unit has at least one current pulse generator configured to generate a first current pulse and a second current pulse. The two wire RTD includes an RTD sensor, a pair of leads electrically coupling the RTD sensor to the control unit, and a switch electrically coupled between the pair of leads and operable in an open state when subjected to the first current pulse, and operable in a closed state when subjected to the second current pulse. When the switch is in the open state, the first current pulse flows through the pair of leads and the RTD sensor. When the switch is in the closed state, the second current pulse flows through the pair of leads via the switch. The control unit is configured to determine the sensor resistance and the corresponding sensor temperature based on the difference between the sensor resistance combined with the lead resistance when the switch is in the open state, and the lead resistance when the switch is in the closed state.

In addition, disclosed is a method of measuring temperature. The method includes applying, using a current pulse generator of a control unit, a first current pulse to one lead of a pair of leads electrically coupling the control unit to an RTD sensor having a sensor resistance. The pair of leads collectively have a lead resistance and are electrically coupled by a switch. The method also includes operating, in response to the first current pulse, the switch in an open state causing the first current pulse to flow through the pair of leads and the RTD sensor. In addition, the method includes measuring, when the switch is in the open state, a first resistance comprising a combination of the sensor resistance and the lead resistance when the switch is in the open state. The method further includes applying, using the current pulse generator, a second current pulse to one lead of the pair of leads. Additionally, the method includes operating, in response to the second current pulse, the switch in a closed state causing the second current pulse to flow through the pair of leads via the switch. Furthermore, the method includes measuring, when the switch is in the closed state, a second resistance comprising the lead resistance. The method also includes determining, using the control unit, the sensor resistance and corresponding sensor temperature based on a difference between the first resistance and the second resistance.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a schematic illustration of an example of a two-wire RTD showing the switch in an open state or open position as a result of being subjected to a first current pulse generated by the current pulse generator, and causing the first current pulse to flow through the pair of leads and the temperature sensor;

FIG. 8 is a schematic illustration of the two-wire RTD of FIG. 7 showing the switch in a closed state or closed position as a result of being subjected to a second current pulse of higher magnitude than the first current pulse, and causing the second current pulse to flow through the pair of leads via the switch;

FIG. 10 is a schematic illustration of an example of a two-wire RTD wherein the switch is a passive switch having a diode operating in an open state as a result being subjected to a first current pulse flowing in a first direction, and causing the first current pulse to flow through the pair of leads and the temperature sensor;

FIG. 11 is a schematic illustration of the two-wire RTD of FIG. 10 showing the diode operating in a closed state as a result of being subjected to a second current pulse flowing in a second direction opposite the first direction, and causing the second current pulse to flow through the pair of leads only;

FIG. 12 is a schematic illustration of an example of a two-wire RTD wherein the switch has a field effect transistor (FET) shown operating in an open state as a result being subjected to a first current pulse flowing, and causing the first current pulse to flow through the pair of leads and the temperature sensor;

FIG. 13 is a schematic illustration of the two-wire RTD of FIG. 10 showing the field effect transistor (FET) operating in a closed state as a result of being subjected to a second current pulse of higher magnitude than the first current pulse, and causing the second current pulse to flow through the pair of leads;

DETAILED DESCRIPTION

Figure 1:
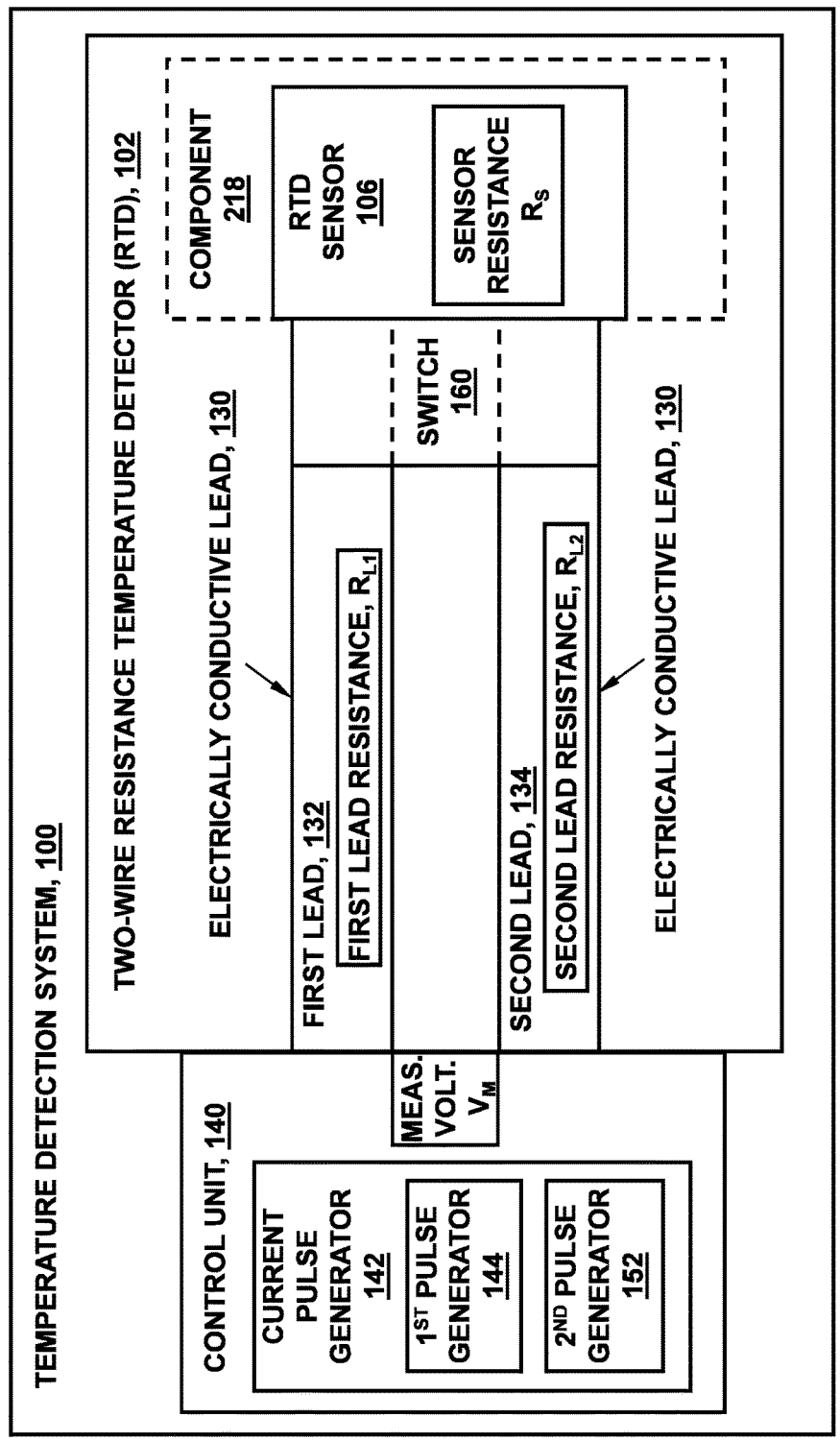
FIG. 1 is a block diagram of a temperature detection system having a two-wire resistance temperature detector (RTD) including a temperature sensor, a pair of leads (e.g., two wires) extending between the temperature sensor and a control unit, and a switch electrically coupled between the pair of leads.

Referring now to the drawings wherein the showings are for purposes of illustrating preferred and various embodiments of the disclosure, shown in FIG. 1 is a block diagram of a temperature detection system 100 having a two-wire resistance temperature detector (RTD) 102 electrically coupled to a control unit 140. The two-wire RTD 102 includes an RTD sensor 106, a pair of electrically conductive leads 130 extending between the RTD sensor 106 and the control unit 140, and a switch 160 electrically coupled between the pair of leads 130. The RTD sensor 106 includes a resistive element formed of platinum, nickel, or copper, or other material, and configured to be coupled to a component 218 for which the temperature is being measured or monitored. The component 218 may be an object to which the RTD sensor 106 is mounted for measuring the object temperature, or the component 218 may be a material such as a fluid within which the RTD sensor 106 may be immersed for measuring the fluid temperature. The RTD sensor 106 has a sensor resistance $R_S$ that changes in linear correspondence with changes in the sensor temperature T.

The pair of leads 130 include a first lead 132 and a second lead 134 each extending between and electrically coupling the RTD sensor 106 to the control unit 140. The leads 130 may be provided as electrically conductive wires such as insulated or non-insulated metallic (e.g., copper, aluminum, etc.) wires. The pair of leads 130 collectively have a lead resistance $R_L$ that varies with temperature. The lead resistance $R_L$ is the sum of a first lead resistance $R_{L1}$ of the first lead 132 and the second lead resistance $R_{L2}$ of the second lead 134. The first lead 132 and the second lead 134 are preferably of the same length, gauge, and material such that the first lead resistance $R_{L1}$ and the second lead resistance $R_{L2}$ are substantially equivalent.

The control unit 140 may be a standalone unit dedicated to one or more of the two-wire RTDs 102, or the control unit 140 may integrated into an electronic module (not shown) or device of another system (not shown). The control unit 140 has at least one current pulse generator 142 configured to generate a first current pulse 146 and a second current pulse 151. For example, the control unit 140 may include a single current pulse generator 142 configured to apply a first current pulse 146 and a second current pulse 151 to at least one of the leads 130 as shown in FIGS. 7 and 8, for example, and described in more detail below. Alternatively, the control unit 140 may include a first pulse generator 144 and a second pulse generator 152. The first pulse generator 144 may be configured to apply a first current pulse 146, and the second pulse generator 152 may be configured to apply a second current pulse 151.

Regardless of whether the control unit 140 includes a single current pulse generator 142, or a first pulse generator 144 and a second pulse generator 152, the first current pulse 146 may be applied to either the first lead 132 or the second lead 134, and the second current pulse 151 may be applied to either the first lead 132 or the second lead 134. In some examples, the first current pulse 146 may have the same magnitude as the second current pulse 151. In other examples, the second current pulse 151 may have a higher magnitude than the first current pulse 146. The first current pulse 146 and the second current pulse 151 may each have a relatively low magnitude such as on the order of milliamps (mA). For example, the first current pulse 146 may be approximately 1 mA and the second current pulse 151 may be approximately 1 mA or 2 mA. As described in greater detail below, a higher magnitude of the second current pulse 151 may be desirable in order to compensate for the low resistance of the leads 130 (e.g., less than 1 ohm for 100 feet of 12 gauge copper wire at 20 degrees C.) relative to the high nominal resistance $R_0$ of the RTD sensor 106. For example, an RTD sensor 106 may have a nominal resistance $R_0$ at 0 degrees C. on the order of hundreds of ohms (e.g., 100 ohms, 200 ohms, 500 ohms, 1000 ohms, 5000 ohms, etc.).

Referring to FIGS. 7 and 8, advantageously, the switch 160 is operable in an open state 162 (FIG. 7) when subjected to the first current pulse 146, and the switch 160 is operable in a closed state 164 (FIG. 8) when subjected to the second current pulse 151. In some examples, the switch 160 in the open state 162 causes the first current pulse 146 to bypass the switch 160, and flow in series through the pair of leads 130 and the RTD sensor 106. For example, when the switch 160 is in the open state 162, the first current pulse 146 may flow in series through the first lead 132, the RTD sensor 106, and the second lead 134. When the switch 160 is in the closed state 164, the second current pulse 151 is shunted through the switch 160, bypassing the RTD sensor 106, and thereby causing the second current pulse 151 to flow through the pair of leads 130 via the switch 160. For example, when the switch 160 is in the open state 162, the second current pulse 151 may flow in series through the first lead 132, the switch 160, and the second lead 134, and the second current pulse may not flow through the RTD sensor 106.

The switch 160 enables the control unit 140 to determine the sensor resistance $R_S$ and corresponding sensor temperature T based on the difference between a first resistance and a second resistance. The first resistance represents the sensor resistance $R_S$ combined with the lead resistance $R_L$ when the switch 160 is in the open state 162. The second resistance represents the lead resistance $R_L$ when the switch 160 is in the closed state 164. The control unit 140 may include a voltmeter or may be otherwise configured to determine the first resistance by measuring a voltage $V_M$ across the pair of leads 130 during the application of the first current pulse 146 when the switch 160 is in the open state 162. The control unit 140 may determine the second resistance by measuring the voltage $V_M$ across the pair of leads 130 during the application of the second current pulse 151 when the switch 160 is in the closed state 164. Using known values of the magnitude of the first current pulse 146 and the measured voltage $V_M$ when the switch 160 is in the open state 162, the first resistance may be calculated using the relationship V=I×R. Similarly, using known values of the magnitude of the second current pulse 151 and the measured voltage $V_M$ when the switch 160 is in the closed state 164, the second resistance may be calculated. The sensor resistance $R_S$, calculated as the difference between the first resistance and the second resistance, can be used in the following relationship to calculate the sensor temperature T of the two-wire RTD 102:

$$R_S = R_0[1 + aT + bT^2 + cT^3(T-100)] \quad \text{(Equation 100)}$$

wherein:
$R_S$=RTD sensor resistance at temperature T.
$R_0$=RTD sensor nominal resistance at 0 degrees C.
a, b, and c=Calendar-Van Dusen coefficients which may be derived from experimentally determined resistance measurements of the RTD sensor 106 at 0 degrees C. (for coefficient a), 100 degrees C. (for coefficient b), and 260 degrees C. (for coefficient c).

Figure 3:
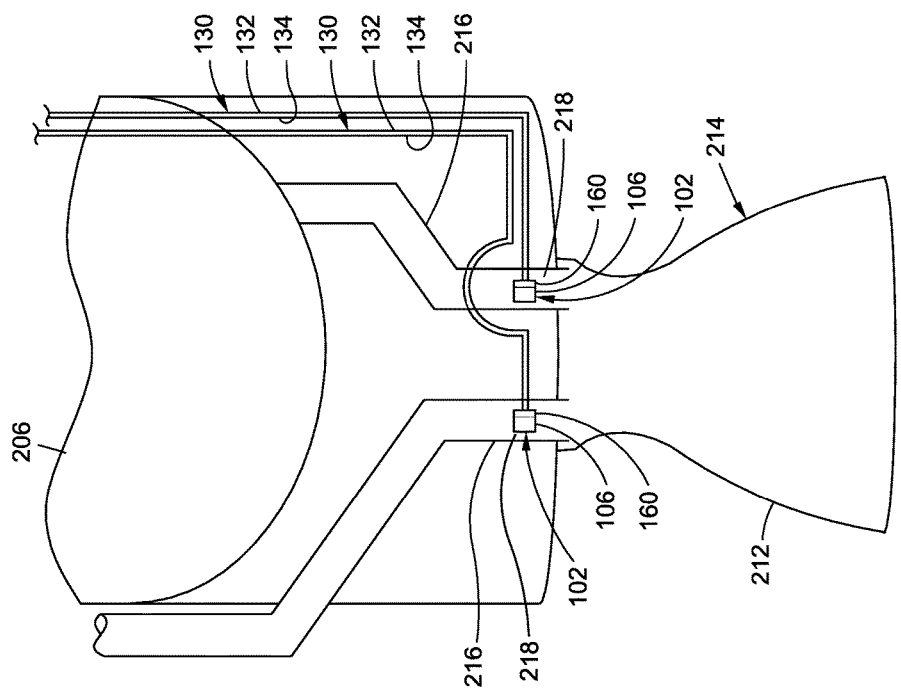
FIG. 3 is a magnified view of a lower portion of the launch vehicle illustrating the presently-disclosed two-wire RTDs mounted on fluid conduits for cryogenic propellant.
Figure 2:
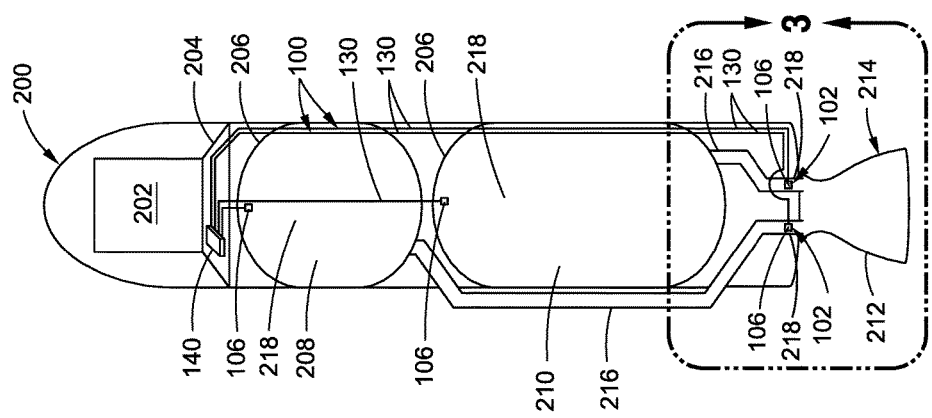
FIG. 2 is an illustration of a non-limiting example of a launch vehicle incorporating a plurality of the presently-disclosed two-wire RTDs.

FIGS. 2-3 show an example of a launch vehicle 200 which may incorporate one or more examples of the presently-disclosed two-wire RTD 102. The launch vehicle 200 has an engine section 214 including a rocket engine 212. In addition, the launch vehicle 200 has a pair of cryogenic propellant tanks 206 including a fuel tank 210 containing cryogenic fuel such as liquid hydrogen ($LH_2$), and an oxidizer tank 208 containing cryogenic oxidizer such as liquid oxygen (LOX). The propellant tanks 206 are each fluidly coupled to the engine section 214 by a fluid conduit 216. A plurality of the presently-disclosed two-wire RTDs 102 may be mounted to various components 218 of the launch vehicle 200 for temperature monitoring. For example, one or more of the two-wire RTDs 102 may be mounted to each of the cryogenic propellant tanks 206 as shown in FIG. 2 and/or one or more of the two-wire RTDs 102 may be mounted to the fluid conduits 216 as shown in FIG. 3.

Figure 4:
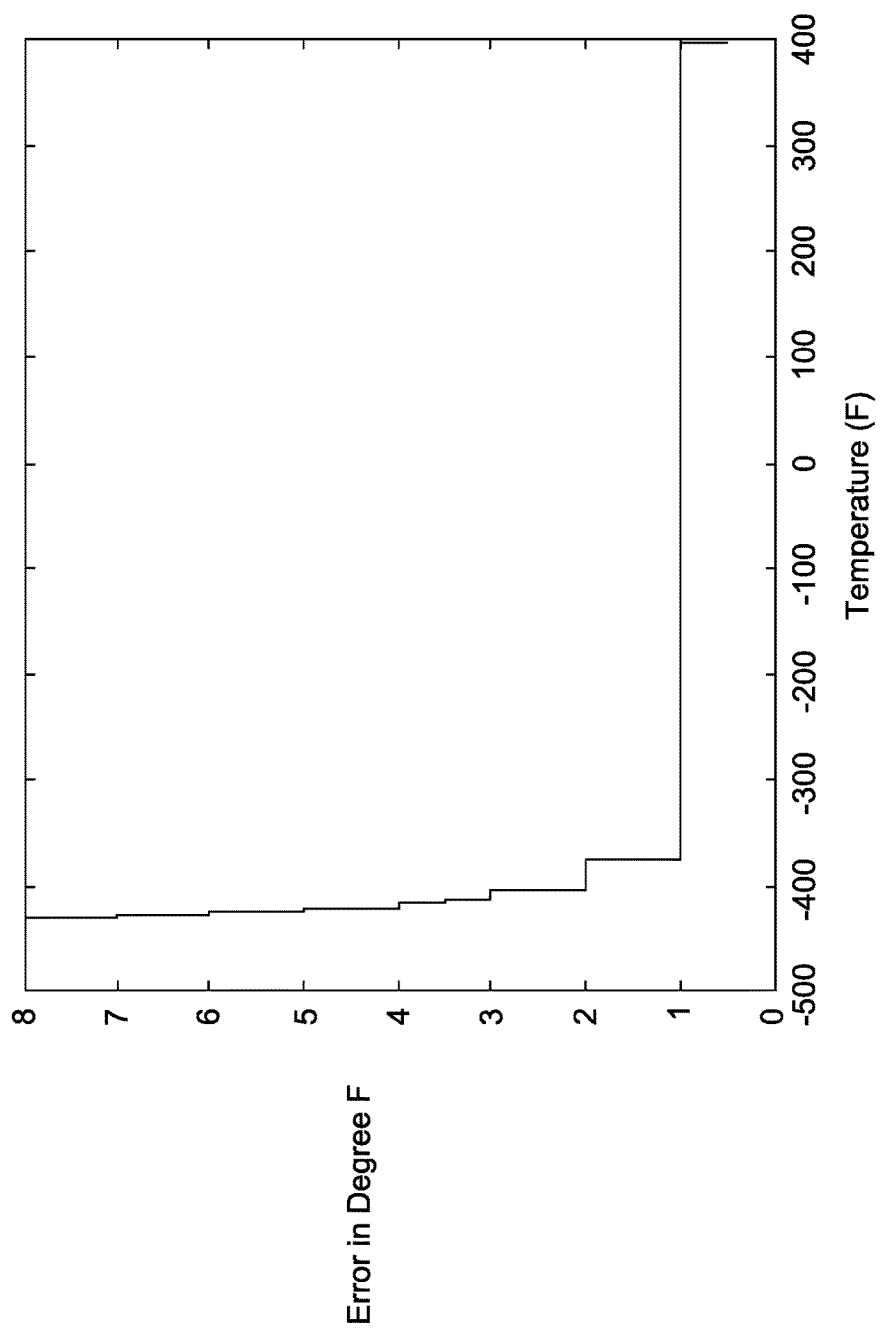
FIG. 4 is a graph plotting temperature vs. error in temperature measurements provided by a conventional two-wire RTD, and illustrating the relatively large errors that occur at cryogenic temperatures, defined herein as temperatures below approximately −300 degrees F.

In FIG. 2, the control unit 140 is shown mounted to a payload attach fitting 204 supporting a payload 202 at a forward end of the launch vehicle 200, and which may result in relatively long leads 130 between the control unit 140 and some of the RTD sensor 106 locations. In addition, the leads 130 may be subjected to different temperatures at different locations along the length of the leads 130. Furthermore, the leads 130 may be subjected to cryogenic temperatures if routed in close proximity to cryogenic temperature sources such as a cryogenic propellant tank 206. As shown in the plot of temperature vs. measurement error of FIG. 4, at cryogenic temperatures, defined herein as temperatures below −300 degrees F. (−184 degrees C.), the error in temperature measurements of a conventional two-wire RTD is relatively large. Advantageously, in the presently-disclosed two-wire RTD 102, the addition of the switch 160 provides a means to remove the resistance of the leads 130 and the associated errors in temperature measurement.

Although FIGS. 2-3 show RTD sensors 106 installed on cryogenic propellant system components 218 of a launch vehicle 200, RTD sensors 106 may also be installed on other components such as components of a rocket engine 212, a thruster, a cooling system component, a solar array, a radiator, and an electronic component. In this regard, the presently-disclosed RTD sensors 106 may be installed on any type of component of any type of vehicle, non-vehicle, system, subsystem, assembly, or subassembly, without limitation. For example, one or more of the RTD sensors 106 may be installed on a component of an aircraft, such as a component of a fuel system, an aircraft engine, an environmental control system, an electrical system, a hydraulic system, an electromechanical system, an avionics system, a braking system, and a flight control system. In addition, RTD sensors 106 may be mounted or placed in contact with non-solid materials such as fluids for measuring or monitoring the fluid temperature.

Figure 5:
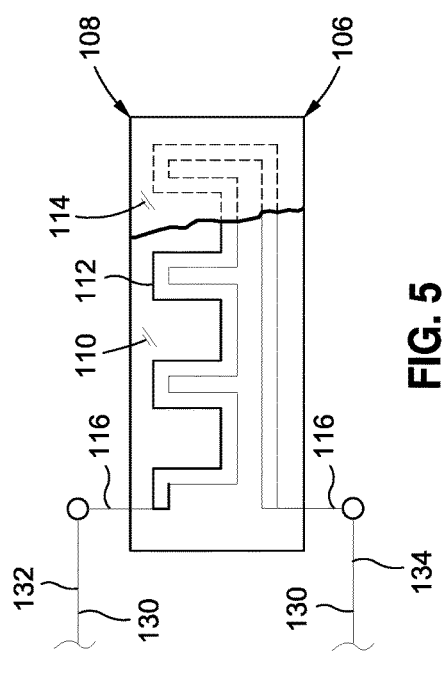
FIG. 5 is an illustration of an example of the RTD sensor configured as a thin-film RTD sensor.

Referring to FIG. 5, shown is an example of the RTD sensor 106 configured as a thin-film RTD sensor 108. The thin-film RTD sensor 108 includes a thin-film resistive layer 112 formed of a resistive material such as platinum, nickel, copper, iron, or other materials or combinations thereof. The thin-film resistive layer 112 may be deposited in a meandering pattern onto a non-conductive substrate 110 which may be formed of glass, ceramic, or any other non-conductive material. A non-conductive coating 114 such as glass or ceramic may be applied over the thin-film resistive layer 112 for protection. A connection element 116 may be coupled to each end of the thin-film resistive layer 112 to provide a means for electrically connecting the thin-film sensor 108 to the pair of leads 130 of a two-wire RTD 102.

Figure 6:
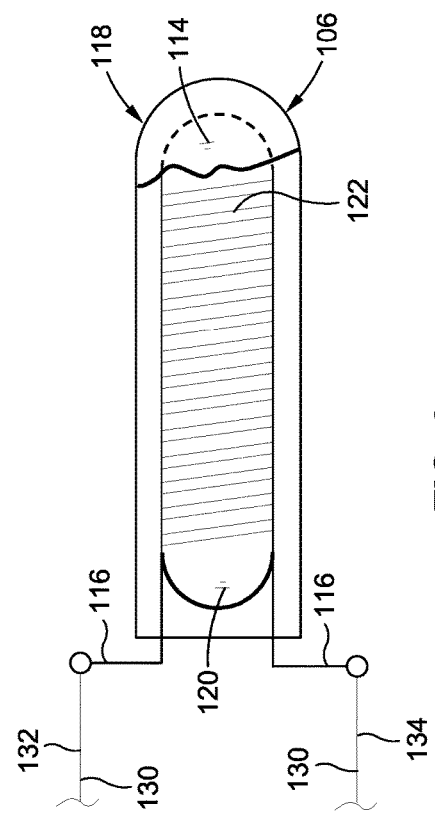
FIG. 6 is an illustration of an example of the RTD sensor configured as a wire wound RTD sensor.

Referring to FIG. 6, shown is an example of the RTD sensor 106 configured as a wire wound RTD sensor 118. The wire wound RTD sensor 118 includes a resistive coil 122 formed of platinum, nickel, copper, iron, or other materials or material combinations. In one embodiment, the resistive coil 122 may be installed within a bore (not shown) of a non-conductive core 120 formed of glass and/or ceramic. Alternatively or additionally, a resistive coil 122 may be wound around the non-conductive core 120 which may be a glass or ceramic cylinder. A non-conductive coating 114 of glass and/or ceramic may be applied over the resistive coil 122 for protection. The opposing ends of the resistive coil 122 may each include connection elements 116 for electrically coupling the resistive coil 122 to the pair of leads 130 of a two-wire RTD 102.

Referring now to FIGS. 7-8, shown is an example of a two-wire RTD 102 showing the operation of an example of a switch 160. For certain applications such as in environments subject to cryogenic temperatures (e.g., less than −300 degrees F.), the switch 160 of the two-wire RTD 102 is preferably a passive switch 174 (e.g., FIGS. 10-13) having no moving parts. In other embodiments, the switch 160 may be configured as an active switch 166 (e.g., FIGS. 7-8) such as a micro-mechanical switch having a movable element 168 that is movable and/or pivotably positionable in either an open state 162 or open position 170 as shown in FIG. 7, or in a closed state 164 or closed position 172 as shown in FIG. 8.

In FIG. 7, the current pulse generator 142 of the control unit 140 is shown applying a first current pulse 146 to the first lead 132. The first current pulse 146 is shown flowing along the first lead 132 in a first direction 149 from the control unit 140 toward the switch 160. When subjected to the first current pulse 146, the switch 160 is either moved to the open position 170 or maintained in the open position 170, causing the first current pulse 146 to flow through the pair of leads 130 and the RTD sensor 106. The flow of the first current pulse 146 through the pair of leads 130 and the RTD sensor 106 results in the first resistance which is the sum of the sensor resistance $R_S$ combined with the lead resistance $R_L$ when the switch 160 is in the open state 162. As mentioned above, the control unit 140 determines the first resistance through the circuit by measuring the voltage $V_M$ across the leads 130 at the location where the leads 130 are electrically coupled to the current pulse generator 142. The control unit 140 measures the voltage $V_M$ when the switch 160 is in the open position 170 and the first current pulse 146 is flowing through the leads 130 and the RTD sensor 106, bypassing the switch 160 in the example of FIG. 7.

FIG. 8 shows the current pulse generator 142 applying the second current pulse 151 to the first lead 132, causing the switch 160 to be in a closed state 164 or closed position 172 as a result of being subjected to the second current pulse 151 of higher magnitude than the first current pulse 146. The second current pulse 151 may be applied to the first lead 132 and may flow along the first direction 149 from the control unit 140 toward the switch 160. When subjected to the second current pulse 151, the switch 160 is moved to or maintained in the closed position 172, causing the second current pulse 151 to flow through the leads 130 via the switch 160. In this regard, the second current pulse 151 flows through the path of least resistance, i.e., thru the closed switch 160. In some example, the second current pulse 151 bypasses the RTD sensor 106 when the switch is in the closed position 172. The flow of the second current pulse 151 through the pair of leads 130 via the switch 160 results in the second resistance which is defined as the lead resistance $R_L$. As indicated above, the lead resistance is the sum of the first lead resistance $R_{L1}$ and the second lead resistance $R_{L2}$. The control unit 140 determines the second resistance by measuring the measured voltage $V_M$ when the switch 160 is in the closed position 172 and the second current pulse 151 is flowing through the leads 130 via the switch 160.

In some embodiments of the two-wire RTD 102, the switch 160 may be normally biased to the open state 162 or open position 170. For example, for an active switch 166 (e.g., FIGS. 7-8) such as a micro-mechanical switch with a movable element 168, the switch 160 may be biased to the open position 170. For a passive switch 174 (FIGS. 10-13), the switch 160 may be biased to the open state 162. By biasing the switch 160 to the open position 170 or open state 162, the control unit 140 may continue to generate sensor temperature measurements in the event of a failure of the switch 160 to operate in the closed state 164 or move to the closed position 172 when subjected to the second current pulse 151. In this regard, biasing the switch 160 toward the open state 162 or open position 170 allows first current pulses 146 to flow through the RTD sensor 106 and the leads 130 so that the control unit 140 may continue providing sensor temperature measurements even though such measurements are not corrected for errors from the lead resistance $R_L$.

In any embodiment of the presently-disclosed two-wire RTD 102, the switch 160 is preferably located within relatively close proximity to the RTD sensor 106 as a means to maximize the length of the leads 130 through which the second current pulses 151 flow for minimizing errors in sensor temperature T. In one example, the switch 160 may be located at a distance from the RTD sensor 106 of less than approximately 10 percent of the length of either the first lead 132 or the second lead 134 in the pair of leads 130. More preferably, the switch 160 is located at a distance from the RTD sensor 106 of less than approximately 1 percent of the length of a lead 130. As indicated above, each one of the leads 130 is preferably, but optionally, the same length. For examples of a two-wire RTD 102 in which the leads 130 are not the same length, the switch 160 may be located within a distance of less than 10 percent and, more preferably, less than approximately 1 percent of the length of the longest lead 130. In some examples, the switch 160 may be integrated into the RTD sensor 106 to form a sensor assembly 104. In this regard, a switch 160 and an RTD sensor 106 may be manufactured and assembled to form a single unit which may be connected to a pair of leads 130 to form a two-wire RTD 102. The two-wire RTD 102 may be electrically coupled to a control unit 140 to form a temperature detection system 100.

Figure 9:
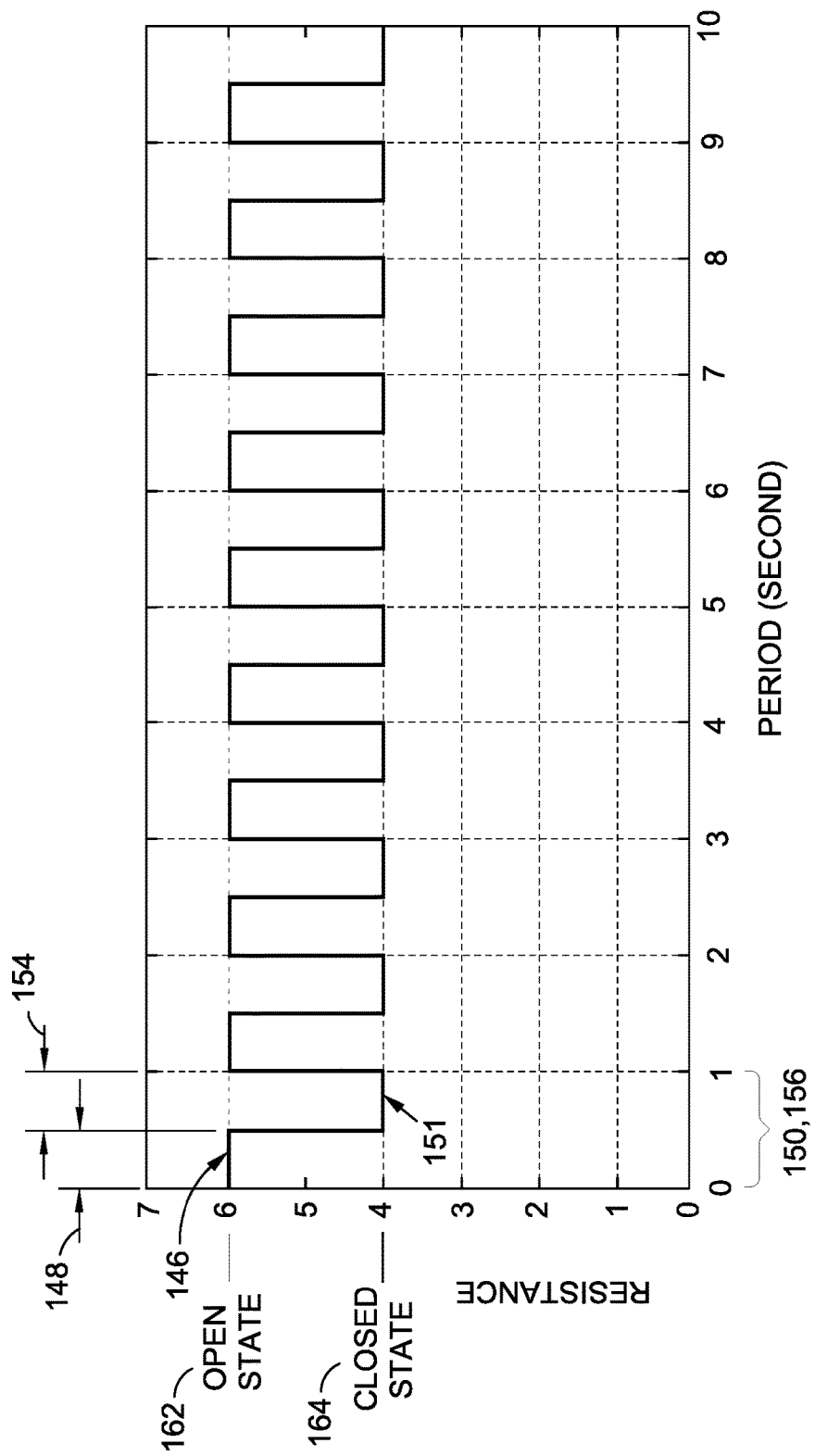
FIG. 9 is a graph plotting pulse period vs. resistance during the alternating application of a first current pulse flowing through the pair of leads and the sensor when the switch is in the open state, and a second current pulse flowing through the pair of leads when the switch is in the closed state.

Referring now to FIG. 9, shown is a graph plotting pulse period vs. resistance in an example illustrating a proof-of-concept application of a first current pulse 146 and a second current pulse 151 in an alternating manner through the presently-disclosed two-wire RTD 102. In the example shown, the first lead resistance $R_{L1}$, the second lead resistance $R_{L2}$, and the sensor resistance $R_S$ are each set to a constant value of 2. The first current pulse 146 has a magnitude of 1 mA and is applied at a first pulse period 150 of one second. The second current pulse 151 is applied at a second pulse period 156 of one second. The second current pulse 151 may be applied at the same magnitude as the first current pulse 146, or the second current pulse 151 may be applied at a different magnitude such as a higher magnitude (e.g., 2 mA) than the first current pulse 146. In the present disclosure, a pulse period may be described as the amount of time between successive current pulses of the same type (e.g., the time period between successive first current pulses). In FIG. 9, the first current pulse 146 and the second current pulse 151 are applied to the leads 130 in an alternating manner causing the switch 160 to alternate between the open state 162 and the closed state 164. Based on measured voltage $V_M$ across the leads 130 as described above, the control unit 140 determines a first measured resistance of 6 ohms during the application of each first current pulse 146, and determines a second measured resistance of 4 ohms during the application of each second current pulse 151.

Although the graph of FIG. 9 shows the first current pulse 146 having a first pulse width 148 of approximately 50 percent of the first pulse period 150, the first pulse width 148 may be less than 50 percent of the first pulse period 150, or the first pulse width 148 may be more than 50 percent of the first pulse period 150. Likewise, although the second pulse is shown having a second pulse width 154 that is approximately 50 percent of the first pulse period 150, the second pulse width 154 may be less or more than 50 percent of the first pulse period 150. In some examples, the second pulse width 154 may be non-overlapping the first pulse width 148. However, in other examples, the second pulse width 154 may overlap at least a portion of the first pulse width 148. In addition, although the graph of FIG. 9 shows a second current pulse 151 being applied for every first current pulse 146, the current pulse generator 142 (e.g., the first pulse generator 144 and the second pulse generator 152) may be operated in a manner such that the second current pulse 151 is applied after multiple applications of the first current pulse 146. In this regard, the current pulse generator 142 or the second pulse generator 152 may apply the second current pulse 151 at a rate that is less than the rate at which the first current pulse 146 is applied to the leads 130. For example, the second current pulse 151 may be applied after every nine (9) applications of the first current pulse 146. In such an arrangement, the control unit 140 may be configured to use the most recently-determined value of the second resistance (e.g., the lead resistance $R_L$ alone) for determining the sensor temperature T.

Referring now to FIGS. 10-11, shown is an example of a two-wire RTD 102 wherein the switch 160 is configured as a passive switch 174 having a diode 176. The diode 176 is operable in the open state 162 when subjected to a first current pulse 146, as shown in FIG. 10. The diode 176 is operable in the closed state 164 when subjected to a second current pulse 151 of the same or different magnitude than the first current pulse 146 and flowing in an opposite direction relative to the first current pulse 146, as shown in FIG. 11. The diode 176 has a cathode 180 and an anode 178. In FIGS. 10-11, the cathode 180 is coupled to the first lead 132 and the anode 178 is coupled to the second lead 134. In such an orientation, the diode 176 is operable in the open state 162 when subjected to the first current pulse 146 applied by the current pulse generator 142 to the first lead 132 in a first direction 149, and is operable in the closed state 164 when subjected to the second current pulse 151 applied by the current pulse generator 142 to the second lead 134 in a second direction 155 opposite the first direction 149. Alternatively, the diode 176 may be oriented such that the cathode 180 is coupled to the second lead 134 and the anode 178 is coupled to the first lead 132, in which case the first current pulse 146 may be applied to the second lead 134 in a second direction 155 causing the diode 176 to be operable in the open state 162, and the second current pulse 151 may be applied to the first lead 132 in a first direction 149 causing the diode 176 to be operable in the closed state 164.

For embodiments of a two-wire RTD 102 that require the application of the first current pulse 146 in a direction opposite the second current pulse 151, the current pulse generator 142 may be provided as a bidirectional pulse generator 158 configured to apply the first current pulse 146 to one of the leads 130 in the first direction 149, and apply the second current pulse 151 to the remaining lead 130 in the second direction 155. For a switch 160 configured as a diode 176, the magnitude of the first current pulse 146 may optionally be the same magnitude as the second current pulse 151. However, the magnitude of the second current pulse 151 may be higher or lower than first current pulse 146. Preferably, as mentioned above, the magnitude of the second current pulse 151 is higher than the magnitude of the first current pulse 146 to compensate for the low resistance of the pair of leads 130 alone relative to the high resistance of the RTD sensor 106.

In any of the embodiments disclosed herein, the switch 160 may be configured to prevent leakage of the first current pulse 146 through the switch 160 in the open state 162. However, for some switch configurations, relatively small leakage of the first current pulse 146 through the switch 160 may occur. For example, relatively small leakage of the first current pulse 146 may occur through the diode 176 in FIG. 10 or through the Zener diode 190, the FET 182, and/or the switch resistor 192 in FIG. 12. Such relatively small leakage of the first current pulse 146 may result in a relatively small contribution of switch resistance to the first resistance which represents a combination of the sensor resistance $R_S$ and the lead resistance $R_L$, as described above. In some examples, the control unit 140 may be configured to ignore the contribution of the switch resistance when determining the first resistance. In this regard, the magnitude of the switch resistance may be small relative to the combined total of the lead resistance $R_L$ and the sensor resistance $R_S$. For example, the switch resistance may be less than 10 percent of the combined total of the lead resistance $R_L$ and the sensor resistance $R_S$.

In other examples, the control unit 140 may be configured to compensate for the switch resistance when determining the first resistance and/or when determining the second resistance. For example, the control unit 140 may be programmed to reduce the first resistance or the second resistance by a fixed amount (e.g., 1 ohm) to compensate for the switch resistance. The value of the switch resistance may be predetermined based on a mean temperature of the predicted operating temperature range of the component to which the RTD sensor is mounted. In another example, the control unit 140 may be programmed to refer to a lookup table of switch resistance vs. most-recently-determined sensor temperature to determine the value of the switch resistance. Even further, the control unit 140 may be programmed to determine the switch resistance as a percentage of the sensor resistance $R_S$ based on a nominal value of the switch resistance at a standard temperature (e.g., 1 ohm at 0 degree C.) and the nominal value of the RTD sensor at the same standard temperature (e.g., 500 ohms at 0 degrees C.), and dynamically increase or decrease the switch resistance in proportion to a respective increase or decrease in the most-recently determined sensor temperature (e.g., a certain percentage change in the nominal switch resistance with every 1 degree C. change in sensor temperature).

In some example, the switch 160 in the closed state (e.g., FIGS. 8, 11, and 13) may be configured to prevent the second current pulse 151 from flowing through the RTD sensor. However, for switch configurations where an amount of the second current pulse 151 flows through the RTD sensor when the switch 160 is in the closed state, the control unit 140 may be configured to ignore the contribution of the sensor resistance $R_S$ when determining the second resistance which represents the lead resistance $R_L$ of the first lead 132 and the second lead 134, as described above. Alternatively, the control unit 140 may be configured to compensate for the sensor resistance $R_S$ when determining the second resistance. Due to the large magnitude of the sensor resistance $R_S$ (e.g., 100 ohms, 500 ohms, etc.) relative to the switch resistance (e.g., less than 10 ohms), a relatively small portion of the second current pulse 151 may flow through the RTD sensor resulting in a relatively small contribution by the sensor resistance $R_S$ to the second resistance as determined by the control unit 140.

Referring now to FIGS. 12-13, shown is an example of a two-wire RTD 102 wherein the switch 160 includes a field effect transistor 182 (FET). The FET 182 has a gate 184, a drain 186, and a source 188. In the example shown, the source 188 is coupled to the first lead 132 and the drain 186 is coupled to the second lead 134. The gate 184 of the FET 182 is connected to an anode 178 of a Zener diode 190. The cathode 180 of the Zener diode 190 is coupled to the first lead 132. The gate 184 of the FET 182 is also connected to one end of a switch resistor 192. The opposite end of the switch resistor 192 is coupled to the second lead 134. In such an arrangement, the FET 182 is operable in an open state 162 when subjected to a first current pulse 146 (e.g., FIG. 12), and operable in a closed state 164 (e.g., FIG. 13) when subjected to a second current pulse 151 of a higher magnitude than the first current pulse 146 and flowing in the same direction as the first current pulse 146. When the FET 182 is in the open state 162, the first current pulse 146 flows through the pair of leads 130 and the RTD sensor 106. When the FET 182 is in the closed state 164, the second current pulse 151 flows through the pair of leads 130 only.

Figure 14:
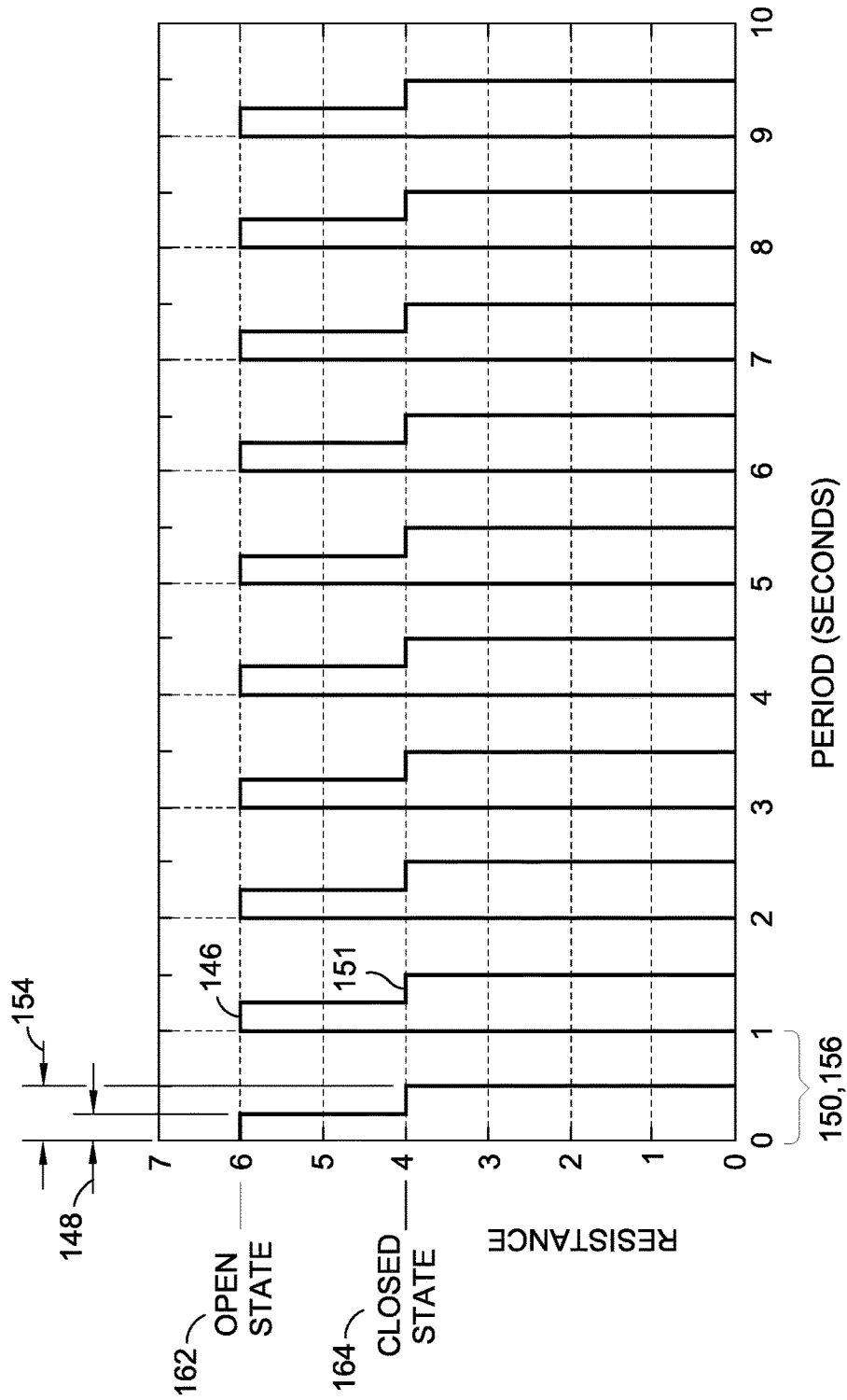
FIG. 14 is a graph plotting pulse period vs. resistance during the application of a first current pulse and second current pulse having the same pulse period, wherein the first current pulse has a first pulse width that is 25 percent of the pulse period, and the second current pulse has a second pulse width that is 50 percent of the pulse period.

Referring to FIG. 14, shown is a graph plotting pulse period vs. resistance during the application of a series of first current pulses 146 and second current pulses 151 in a manner that reduces power consumption relative to the increased power consumption associated with the uninterrupted application of the first current pulses 146 and second current pulses 151 as illustrated in FIG. 9. In this regard, the first current pulses 146 and the second current pulses 151 may be applied in a manner such that within a part of each pulse period, the two-wire RTD 102 is non-energized. As mentioned above, the first current pulses 146 and the second current pulses 151 may be respectively applied to the leads 130 by a first pulse generator 144 and a second pulse generator 152.

In FIG. 14, a first pulse generator 144 may apply the first current pulses 146 to one of the leads 130 at a predetermined first pulse period 150 (e.g., every second). The value of the first pulse period 150 may be dictated by the desired temperature sampling rate of the component being monitored. In FIG. 14, the first current pulse 146 has a first pulse width 148 that is less than the first pulse period 150. A second pulse generator 152 may apply the second current pulses 151 at a second pulse period 156 of no less than the first pulse period 150. The second current pulse 151 has a second pulse width 154 that is shorter than the first pulse period 150 and longer than the first pulse width 148 and overlapping at least a portion of the first pulse width 148 such that the RTD sensor 106 is non-energized during a portion of each first pulse period 150. For example, in FIG. 14, the first pulse width 148 is approximately 25 percent of the first pulse period 150, and the second pulse width 154 is approximately 50 percent of the first pulse period 150. The second pulse width 154 overlaps the first pulse width 148. The second current pulse 151 is additive to the first current pulse 146 when the second pulse width 154 overlaps the first pulse width 148. FIG. 14 illustrates that for 50 percent of each one of the pulse periods 150, 156, the two-wire RTD 102 is non-energized, resulting in reduced power consumption of the two-wire RTD 102 relative to the power consumption of the two-wire RTD 102 in FIG. 9 which illustrates the two-wire RTD 102 being constantly energized during each pulse period by a combination of the first current pulse 146 and the second current pulse 151.

Figure 15:
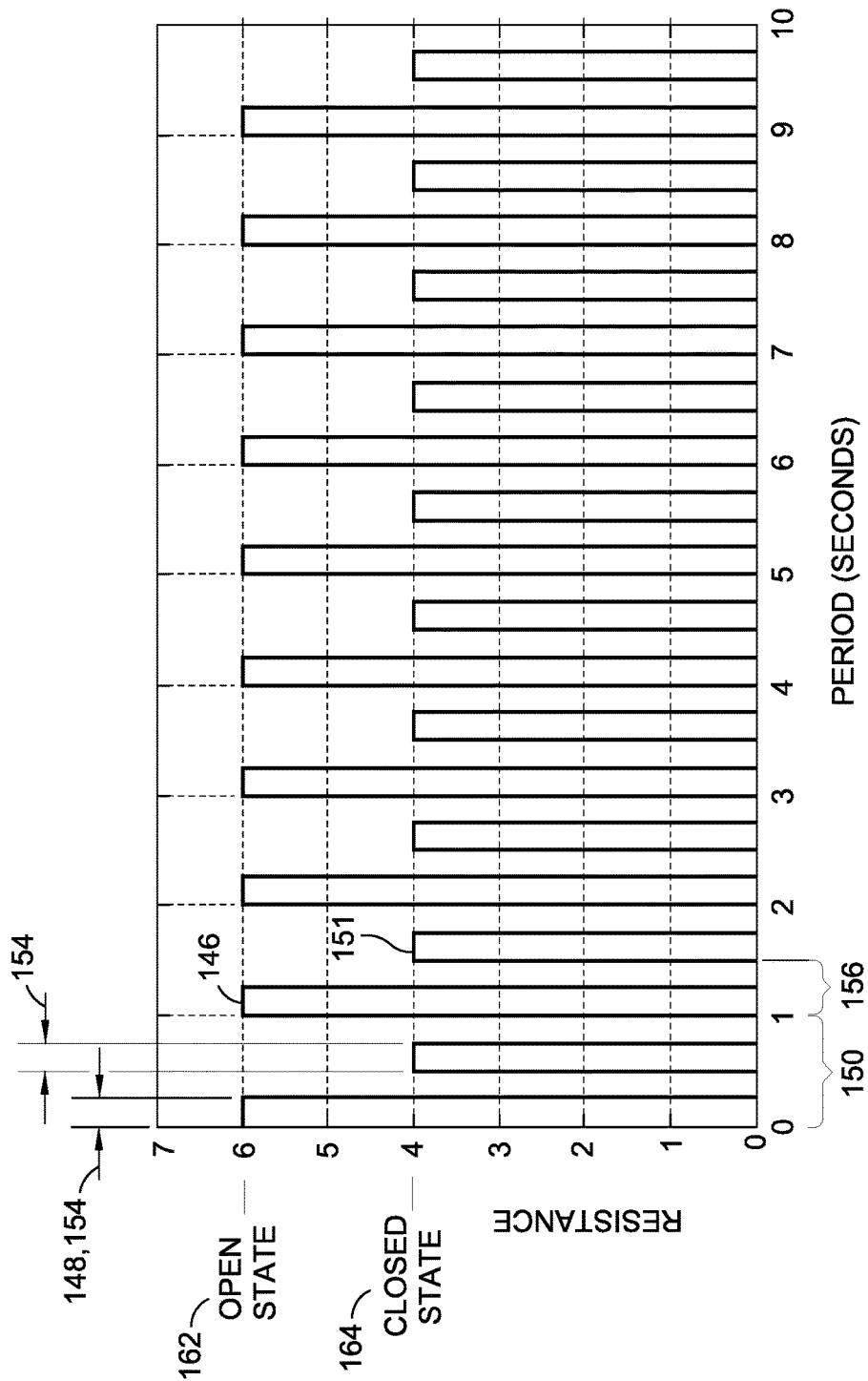
FIG. 15 is a graph plotting pulse period vs. resistance during the application of a first current pulse of first pulse period and second current pulse of second pulse period, wherein the first current pulse has a first pulse width that is 25 percent of the first pulse period, the second pulse period that is 50 percent of the first pulse period, and the second pulse width is 50 percent of the second pulse period.

Referring to FIG. 15, shown is a graph plotting pulse period vs. resistance in another example of an arrangement that reduces power consumption during the application of first current pulses 146 and second current pulses 151 to a two-wire RTD 102. For the example of FIG. 15, a first pulse generator 144 may apply the first current pulse 146 to one of the leads 130 (e.g., to the first lead) at a first pulse period 150. The first current pulse 146 may have a first pulse width 148 that is less than the first pulse period 150. A second pulse generator 152 may apply the second current at a second pulse period 156 that is an even fraction of (e.g., one half) of the first pulse period 150 and in a manner such that during each one of the first pulse periods 150, a second pulse width 154 overlaps at least a portion of a first pulse width 148 and the RTD sensor 106 is non-energized. In FIG. 15, the first pulse width 148 is approximately 25 percent of the first pulse period 150 of 1 second. The second pulse width 154 is approximately 25 percent of the first pulse period 150. In addition, the second pulse period 156 is one half the first pulse period 150. During each first pulse period 150, the second pulse width 154 overlaps and is additive to at least a portion of the first pulse width 148.

Figure 16:
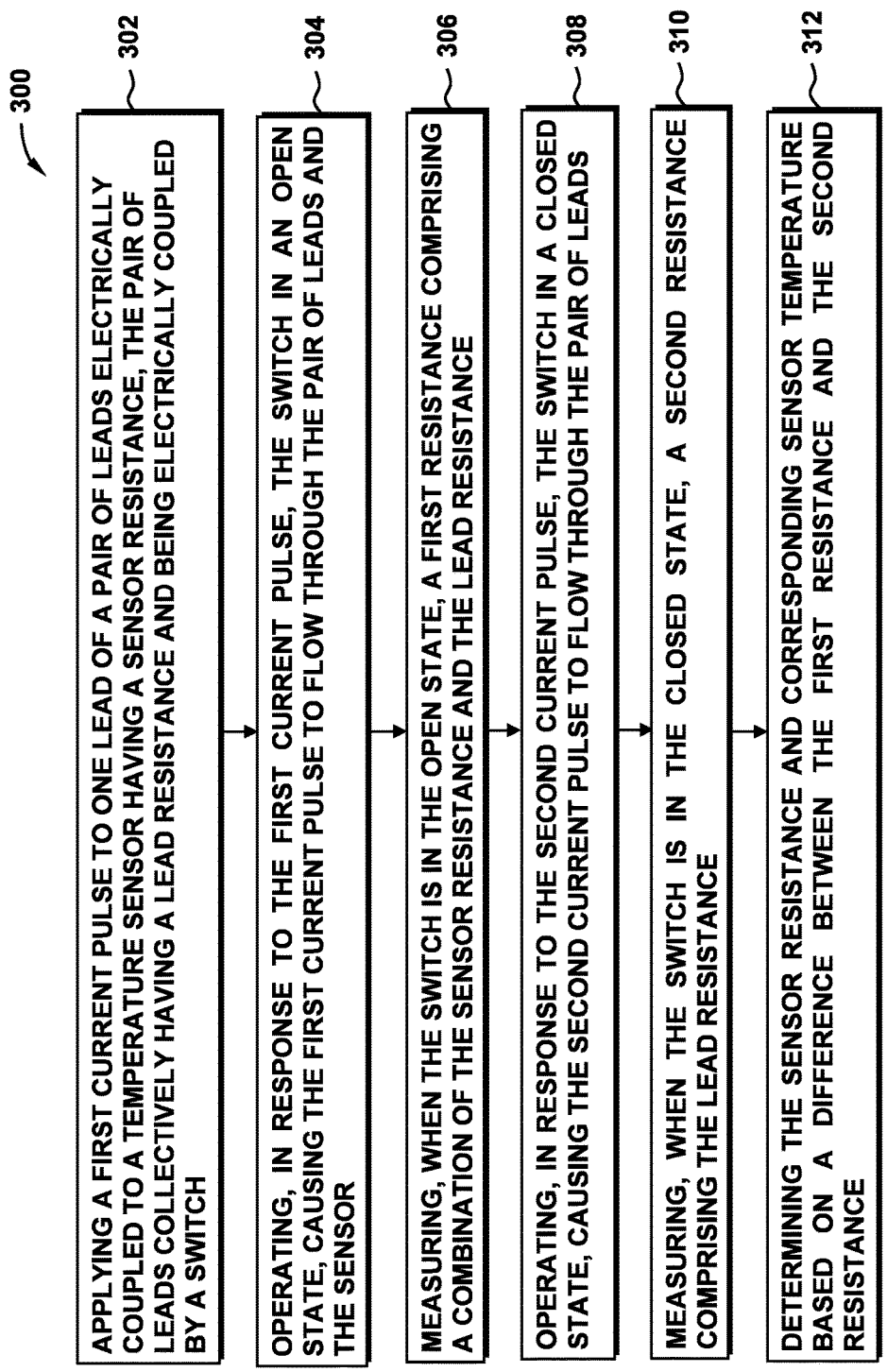
FIG. 16 is a flowchart having one or more operations included in a method of measuring temperature.

FIG. 16 is a flowchart having one or more operations included in a method of measuring temperature using the presently-disclosed temperature detection system 100. Step 302 of the method includes applying, using a current pulse generator 142 of a control unit 140, a first current pulse 146 to one lead 130 of a pair of leads 130. As indicated above, the pair of leads 130 electrically couple the control unit 140 to an RTD sensor 106 which has a sensor resistance $R_S$. The pair of leads 130 collectively have a lead resistance $R_L$ and are electrically coupled to one another by a switch 160, as described above.

Step 304 of the method includes operating the switch 160 in an open state 162 in response to the switch 160 being subjected to the first current pulse 146. FIG. 7 illustrates an example of a switch 160 in an open state 162 or open position 170. As indicated above, the switch 160 in the open state 162 causes the first current pulse 146 to flow through the pair of leads 130 and the RTD sensor 106.

Step 306 includes measuring, at the control unit 140 when the switch 160 is in the open state 162, a first resistance. As mentioned above, the first resistance comprises a combination of the sensor resistance $R_S$ and the lead resistance $R_L$ when the switch 160 is in the open state 162 and the first current pulse 146 is flowing through the RTD sensor 106 and the leads 130. The control unit 140 includes the capability for measuring the measured voltage $V_M$ across the leads 130 during the application of the first current pulse 146. As indicated above, when the switch 160 is in the open state 162, the control unit 140 calculates the first resistance (e.g., the sensor resistance $R_S$ plus the lead resistance $R_L$) based on the measured voltage $V_M$ and the magnitude of the first current pulse 146.

Step 308 of the method includes applying, using the current pulse generator 142, a second current pulse 151 to one lead 130 of the pair of leads 130. The step of applying the second current pulse 151 to one of the leads 130 may include applying the second current pulse 151 at a higher magnitude than the first current pulse 146. As indicated above, applying the second current pulse 151 at a higher magnitude than the first current pulse 146 may compensate for a low resistance of the leads 130 relative to the resistance of the RTD sensor 106.

In some examples, the step of applying the first current pulse 146 to one of the leads 130 may be performed using a first pulse generator 144, and the step of applying the second current pulse 151 to one of the leads 130 may be performed using a second pulse generator 152. Regardless of whether the first current pulse 146 and second current pulse 151 are applied by a single current pulse generator 142 or by a respective first pulse generator 144 and second pulse generator 152, some examples of the method 300 may include applying the second current pulse 151 at a second pulse width 154 that is non-overlapping a first pulse width 148 of the first current pulse 146.

Referring briefly to FIG. 14, step 302 of applying the first current pulse 146 to one of the leads 130 may include applying, using the first pulse generator 144, the first current pulse 146 to one of the leads 130 (e.g., to the first lead) at a first pulse period 150. The first current pulse 146 may be applied with a first pulse width 148 that is less than the first pulse period 150. For example, the first pulse width 148 may be 50 percent of the first pulse period 150. Step 308 of applying the second current pulse 151 to one of leads 130 may include applying, using the second pulse generator 152, the second current pulse 151 at a second pulse period 156 that is no less than the first pulse period 150. As shown in FIG. 14, the second current pulse 151 may have a second pulse width 154 that is shorter than the first pulse period 150 and longer than the first pulse width 148 and may overlap at least a portion of the first pulse width 148 such that the RTD sensor 106 is non-energized during a portion of each first pulse period 150. As mentioned above, such an arrangement may result in reduced power consumption relative to the arrangement illustrated in FIG. 9 in which the RTD sensor 106 is constantly energized by the combination of the first current pulse 146 and the second current pulse 151. In a further example for reducing power consumption, the method may include applying the second current pulse 151 (e.g., calibrating pulse) at a rate that is less than the rate at which the series of the first current pulses 146 are applied. The first current pulse 146 is preferably applied at a rate that is no less than a desired rate for sampling the component 218 temperature.

Referring briefly to FIG. 15, in a further embodiment, step 302 of applying the first current pulse 146 302 may include applying the first current pulse 146 at a first pulse period 150, and in a manner such that the first current pulse 146 has a first pulse width 148 that is less than the first pulse period 150. Step 308 of applying the second current pulse 151 may include applying the second current pulse 151 at a second pulse period 156 that is an even fraction (e.g., one half) of the first pulse period 150 and in a manner such that during each one of the first pulse periods 150, a second pulse width 154 overlaps at least a portion of the first pulse width 148 and such that the RTD sensor 106 is non-energized during at least a portion of the first pulse period 150.

Referring to FIG. 16, step 310 of the method includes operating, in response to the second current pulse 151, the switch 160 in a closed state 164 causing the second current pulse 151 to be shunted through the switch 160 such that the second current pulse 151 flows through the pair of leads 130, and is prevented from flowing through the RTD sensor 106. Referring briefly to FIGS. 7-8, for examples where the switch 160 is an active switch 166, the step 304 of operating the switch 160 in the open state 162 includes moving (e.g., pivoting and/or translating) a movable element 168 of the active switch 166 to an open position 170 corresponding to the open state 162 when the active switch 166 is subjected to the first current pulse 146, and step 310 includes moving (e.g., pivoting and/or translating) the movable element 168 of the active switch 166 to a closed position 172 corresponding to the closed state 164 when the active switch 166 is subjected to the second current pulse 151. In some examples, the method may include 304 biasing the movable element 168 of the active switch 166 to the open position 170 such that in the event that the active switch 166 fails to move to the closed position 172 in response to the second current pulse 151, temperature measurements can still be made.

Referring briefly to FIGS. 10-11, for examples where the switch 160 is a passive switch 174 such as a diode 176, step 304 of operating the passive switch 174 in the open state 162 includes operating the diode 176 in the open state 162 when subjected to the first current pulse 146, and step 310 includes operating the diode 176 in the closed state 164 when subjected to the second current pulse 151 flowing in a direction opposite the first current pulse 146. For the example of FIGS. 10-11, the second current pulse 151 may be the same magnitude or a different magnitude than the first current pulse 146. The step 304 of operating a switch 160 in the open state 162 may optionally include using a bidirectional pulse generator 158 to apply the first current pulse 146 to one of the leads 130 (e.g., the first lead) in the first direction 149, and apply the second current pulse 151 to a remaining one of the leads 130 (e.g., the second lead) in the second direction 155 opposite the first direction 149.

Referring briefly to FIGS. 12-13, for examples where the switch 160 includes a field effect transistor (FET) 182, step 304 of operating the switch 160 in the open state 162 may include operating the FET 182 in the open state 162 when subjected to the first current pulse 146, and step 310 of operating the switch 160 in the closed state 164 may include operating the FET 182 in the closed state 164 when subjected to the second current pulse 151 of a higher magnitude than the first current pulse 146 and flowing in the same direction as the first current pulse 146. For example, as shown in FIGS. 12-13, the first current pulse 146 and the second current pulse 151 are each flowing in the first direction 149. Alternatively, the first current pulse 146 and the second current pulse 151 may each flow in the second direction 155. The flow direction of the first current pulse 146 and the second current pulse 151 may be dependent upon the orientation of the FET 182.

Referring to FIG. 16, step 312 of the method includes measuring the second resistance at the control unit 140 when the switch 160 is in the closed state 164. In this regard, the control unit 140 determines the measured voltage $V_M$ across the pair of leads 130 during the application of the second current pulse 151. Based on the measured voltage $V_M$ and the magnitude of the second current pulse 151, the control unit 140 calculates the second resistance (e.g., the lead resistance $R_L$) during the flow of the second current pulse 151 through the pair of leads 130.

Step 314 of the method includes determining, using the control unit 140, the sensor resistance $R_S$ and the corresponding sensor temperature T based on the difference between the first resistance and the second resistance. As indicated above, the sensor temperature T may be determined using the relationship expressed in above-mentioned Equation 100 based on the RTD sensor resistance $R_S$ at temperature T, the RTD sensor nominal resistance $R_0$ at 0 degrees C., and the Calendar-Van Dusen coefficients (a, b, and c) as described above. The step 314 of determining the sensor resistance $R_S$ and the corresponding sensor temperature T may include accurately determining the temperature of a component or material of an aircraft, a space vehicle, or any one of a variety of other vehicles, non-vehicles, systems, subsystems, assemblies and/or subassemblies, without limitation.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A two-wire resistance temperature detector (RTD), comprising:
   an RTD sensor having a sensor resistance that changes in correspondence with changes in a sensor temperature of the RTD sensor;
   a pair of leads electrically coupling the RTD sensor to a control unit having at least one pulse generator configured to generate a first current pulse and a second current pulse, the pair of leads collectively having a lead resistance; and
   a switch electrically coupled between the pair of leads and operable in an open state when subjected to the first current pulse and operable in a closed state when subjected to the second current pulse, the open state causing the first current pulse to flow through the pair of leads and the RTD sensor, the closed state causing the second current pulse to flow through the pair of leads via the switch, the switch enabling the control unit to determine the sensor resistance and corresponding sensor temperature, wherein for at least one of the current pulses, the current pulse passes through the pair of leads and the RTD sensor without passing through other electrical components.

2. The two-wire RTD of claim 1, wherein:
   the second current pulse has a magnitude is different than the magnitude of the first current pulse.

3. The two-wire RTD of claim 1, wherein:
   the switch is an active switch movable between an open position corresponding to the open state, and a closed position corresponding to the closed state.

4. The two-wire RTD of claim 3, wherein:
   the switch is biased to the open position.

5. The two-wire RTD of claim 1, wherein the switch comprises a diode operable in:
   the open state when subjected to the first current pulse; and
   the closed state when subjected to the second current pulse flowing in an opposite direction relative to the first current pulse.

6. The two-wire RTD of claim 1, wherein the switch comprises a field effect transistor operable in:
   the open state when subjected to the first current pulse; and
   the closed state when subjected to the second current pulse of a higher magnitude than the first current pulse and flowing in a same direction as the first current pulse.

7. The two-wire RTD of claim 1, wherein:
   the switch is located within a distance from the RTD sensor of less than approximately 10 percent of either one of the leads of the pair.

8. The two-wire RTD of claim 1, wherein:
the RTD sensor is configured as one of a thin film RTD sensor and a wire wound RTD sensor.

9. A temperature detection system, comprising:
a control unit having at least one pulse generator configured to generate a first current pulse and a second current pulse;
a two-wire resistance temperature detector, including:
an RTD sensor having a sensor resistance that changes in correspondence with changes in a sensor temperature;
a pair of leads electrically coupling the RTD sensor to the control unit, the pair of leads collectively having a lead resistance;
a switch electrically coupled between the pair of leads and operable in an open state when subjected to the first current pulse and operable in a closed state when subjected to the second current pulse, the open state causing the first current pulse to flow through the pair of leads and the RTD sensor, the closed state causing the second current pulse to flow through the pair of leads via the switch, wherein for at least one of the current pulses, the current pulse passes through the pair of leads and the RTD sensor without passing through other electrical components; and
the control unit configured to determine the sensor resistance and corresponding sensor temperature based on a difference between:
the sensor resistance combined with the lead resistance when the switch is in the open state; and
the lead resistance when the switch is in the closed state.

10. The temperature detection system of claim 9, wherein:
the at least one pulse generator is configured to generate the second current pulse at a different magnitude than the magnitude of the first current pulse.

11. The temperature detection system of claim 9, wherein:
the at least one pulse generator is a bidirectional pulse generator configured to apply the first current pulse to one of the leads in a first direction, and apply the second current pulse to a remaining one of the leads in a second direction.

12. The temperature detection system of claim 9, wherein the at least one pulse generator includes:
a first pulse generator configured to generate the first current pulse; and
a second pulse generator configured to generate the second current pulse.

13. The temperature detection system of claim 12, wherein:
the first pulse generator is configured to apply the first current pulse to one of the leads at a first pulse period, the first current pulse having a first pulse width that is less than the first pulse period;
the second pulse generator is configured to apply the second current pulse to one of the leads at a second pulse period that is no less than the first pulse period; and
the second current pulse having a second pulse width that is shorter than the first pulse period and longer than the first pulse width and overlapping at least a portion of the first pulse width such that the RTD sensor is non-energized during a portion of each first pulse period.

14. The temperature detection system of claim 12, wherein:
the first pulse generator is configured to apply the first current pulse to one of the leads at a first pulse period, the first current pulse having a first pulse width that is less than the first pulse period; and
the second pulse generator is configured to apply the second current pulse to one of the leads at a second pulse period that is an even fraction of the first pulse period and in a manner such that during each one of the first pulse periods, a second pulse width overlaps at least a portion of a first pulse width and the RTD sensor is non-energized.

15. A method of measuring temperature, comprising:
applying, using a pulse generator of a control unit, a first current pulse to one lead of a pair of leads electrically coupling the control unit to an RTD sensor having a sensor resistance, the pair of leads collectively having a lead resistance and being electrically coupled by a switch;
operating, in response to the first current pulse, the switch in an open state causing the first current pulse to flow through the pair of leads and the RTD sensor, the first current pulse passing through the pair of leads and the RTD sensor without passing through other electrical components;
measuring, when the switch is in the open state, a first resistance comprising a combination of the sensor resistance and the lead resistance when the switch is in the open state;
applying, using the pulse generator, a second current pulse to one lead of the pair of leads;
operating, in response to the second current pulse, the switch in a closed state causing the second current pulse to flow through the pair of leads via the switch;
measuring, when the switch is in the closed state, a second resistance comprising the lead resistance; and
determining, using the control unit, the sensor resistance and corresponding sensor temperature based on a difference between the first resistance and the second resistance.

16. The method of claim 15, wherein the step of applying the second current pulse comprises:
applying the second current pulse at a different magnitude than the first current pulse.

17. The method of claim 15, wherein the steps of operating the switch in the open state and operating the switch in the closed state respectively comprise:
applying, using a bidirectional pulse generator, the first current pulse to one of the leads in a first direction; and
applying, using the bidirectional pulse generator, the second current pulse to a remaining one of the leads in a second direction.

18. The method of claim 15, wherein the steps of applying the first current pulse to a lead and applying the second current pulse to a lead respectively comprise:
applying, using a first pulse generator, the first current pulse to a lead; and
applying, using a second pulse generator, the second current pulse to a lead.

19. The method of claim 18, wherein the steps of applying the first current pulse to one lead of the pair and applying the second current pulse to one lead of the pair include:
applying, using the first pulse generator, the first current pulse to one of the leads at a first pulse period, the first current pulse having a first pulse width that is less than the first pulse period;

applying, using the second pulse generator, the second current pulse to one of the leads at a second pulse period that is no less than the first pulse period; and the second current pulse having a second pulse width that is shorter than the first pulse period and longer than the first pulse width and overlapping at least a portion of the first pulse width such that the RTD sensor is non-energized during a portion of each first pulse period.

20. The method of claim 18, wherein the steps of applying the first current pulse to one lead of the pair and applying the second current pulse to one lead of the pair include:

applying, using the first pulse generator, the first current pulse to one of the leads at a first pulse period, the first current pulse having a first pulse width that is less than the first pulse period; and applying, using the second pulse generator, the second current pulse to one of the leads and at a second pulse period that is an even fraction of the first pulse period and in a manner such that during each one of the first pulse periods, a second pulse width overlaps at least a portion of a first pulse width and the RTD sensor is non-energized.

\* \* \* \* \*